(12) United States Patent
Comte

(10) Patent No.: US 10,772,289 B2
(45) Date of Patent: Sep. 15, 2020

(54) HEAD GATE FOR A CATTLE CONTAINMENT CHUTE

(71) Applicant: Alain Comte, Notre-Dame (CA)

(72) Inventor: Alain Comte, Notre-Dame (CA)

( * ) Notice: Subject to any disclaimer, the term of this patent is extended or adjusted under 35 U.S.C. 154(b) by 379 days.

(21) Appl. No.: 15/826,067

(22) Filed: Nov. 29, 2017

(65) Prior Publication Data
US 2019/0159425 A1 May 30, 2019

(51) Int. Cl.
*A01K 1/06* (2006.01)
*A01K 1/062* (2006.01)

(52) U.S. Cl.
CPC ............ *A01K 1/0613* (2013.01); *A01K 1/062* (2013.01)

(58) Field of Classification Search
CPC .............................. A01K 1/0613; A01K 1/062
See application file for complete search history.

(56) References Cited

U.S. PATENT DOCUMENTS

| 4,357,906 A * | 11/1982 | Kratky | A01K 1/0613 119/731 |
| 5,111,773 A * | 5/1992 | Akins | A01K 1/0613 119/523 |
| 5,184,572 A * | 2/1993 | Meier | A01K 1/0613 119/733 |
| 6,239,711 B1 * | 5/2001 | Downey | A01K 1/0023 340/528 |
| 6,425,351 B1 * | 7/2002 | Mollhagen | A01K 1/0613 119/733 |
| 2007/0017455 A1 * | 1/2007 | De Vor | A01K 1/0613 119/737 |

FOREIGN PATENT DOCUMENTS

FR     2842702 A1 * 1/2004 .......... A01K 1/0613

* cited by examiner

*Primary Examiner* — Jessica B Wong
(74) *Attorney, Agent, or Firm* — Adrian D. Battison; Ade & Company Inc.; Ryan W. Dupuis

(57) ABSTRACT

In a cattle chute including a head gate at the head end with gates movable from a closed position in a common plane to an open position facing the incoming animals there is provided a transverse abutment member across the top of vertical bars of the gates and a pull cord operable by a worker at the rear end of the chute to push the vertical bars into the closed position.

6 Claims, 4 Drawing Sheets

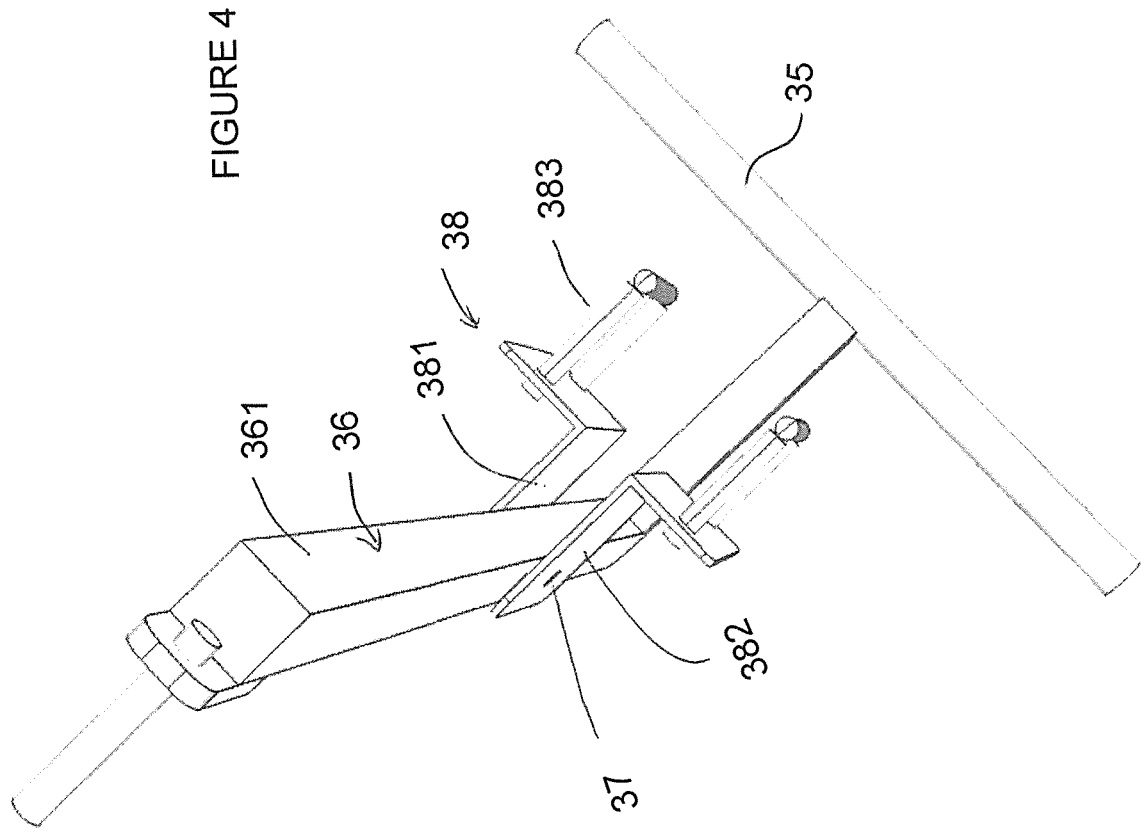

HEAD GATE FOR A CATTLE CONTAINMENT CHUTE

This invention relates to a head gate for a cattle containment chute where cattle are confined to pass in a row through a chute with a head gate at the end and to a head gate arrangement which can make it easier for the handler to control movement of the animal in the chute and closure of the gate.

BACKGROUND OF THE INVENTION

Squeeze chutes are well known and conventionally include a generally channel shaped frame structure having a head end for receiving a head of an animal to be confined, two sides each for extending along a respective side of the animal to be confined, a tail end remote from the head end. A head gate assembly at the head end is operable to move from a release position to a closed position in which the neck of the animal is grasped for confinement of the animal. In some cases, a squeeze side panel is arranged along one side and is operable in a pivoting action to squeeze the animal from one side onto the other side panel so that the body of the animal is also confined. A tail gate section is often provided at the rear end to close behind the animal as it enters the squeeze chute.

The head gate typically comprises a pair of parallel vertical bars with a spacing between them sufficient to receive the neck of the animal without damage but insufficient for the head to be pulled out of the bars and insufficient for the animal to move forward. Each of the bars forms part of a frame which pivots about a vertical axis parallel to the bar and spaced outwardly of the bar. In the locked holding position the frame and the bars line in a common plane transverse to the chute with the bars at their point of closes approach. In a set portion the bar pivots so that it moves along the chute toward the incoming animal with the frame inclined out of the common plane thus increasing the space between the bars.

Thus to catch the cattle by the head, it is common to have a head gate that locks by itself as the cattle try to walk through it. When set in the set catch position, the bars are turned toward the approaching cattle. The approaching animal will see an opening sufficient for its head and try to walk through. The head will fit through the opening, but as the animal tries to walk forward its shoulders hit the bars and the bars move forward with the shoulders until the bars hit a latch at a top of the head gate locking them in the catch position in which the bars lie in the common plane. Normally head gates have a handle projecting out of the frame of one of the bars to one side of the chute which allows a worker standing to that side to push the handle to pivot the frame about its vertical axis that helps pivot head gate to be closed.

Head gates have been manufactured in this construction for many years and many manufacturers have arrangements which operate effectively in this manner. It will be appreciated that the animals concerned are very large and strong with great ability to do damage to themselves and the worker. It is thus highly desirable that even highly recalcitrant animals are trapped in the head gate as quickly and simply as possible with little possibility to back up before being trapped.

SUMMARY OF THE INVENTION it is an object of the present invention to provide an improved head gate which is more ergonomically effective to better allow the worker to catch animals.

According to the invention there is provided a head gate assembly operable by a worker for holding an animal's head, the assembly comprising:

a support frame arranged to be mounted in a position for operating on incoming animals;

a pair of head gate doors;

each door having a vertical bar for cooperating with the vertical bar of the other of the doors to trap the neck of the animal therebetween;

each door being mounted on a hinge support member carried on the support frame for pivotal movement of the door and its vertical bar about a respective pivot axis generally parallel to the first vertical post member and spaced outwardly toward a respective side of the support frame;

the doors being movable from a closed position in which the vertical bars lie in a common plane including the pivot axes to an open position in which the vertical bars are positioned on a side of the common plane facing the incoming animals to allow the head of the animal to enter;

a transverse abutment member extending across the vertical bars in the open position adjacent a top of the vertical bars;

and an operating device movable by an worker for moving the transverse abutment member toward the common plane to push the vertical bars into the closed position.

The arrangement herein thus provides a mechanism that pushes on the bars to help close the head gate. That is, in the preferred arrangement described hereinafter, there is provided a rope that pivots a bar that pushes head gate bars. Because the device pushes directly on head gate bars, it is a direct force that transfers to the doors with little effort.

Preferably the transverse bar is horizontal and generally parallel to the common plane.

Preferably the transverse bar is mounted on a pivot mounting member for pivotal movement about a horizontal axis generally parallel to the common plane.

Preferably the axis is above the vertical bars.

Preferably the pivot mounting member is carried on the support frame above the doors.

Preferably the operating device includes an elongate manually operable member extending from the head gate doors in a direction toward the incoming animals.

Preferably the elongate member is flexible acting as a pull cord to allow the worker to pull the doors to the closed position from the tail end a at a rear of an incoming animal.

According to a second aspect of the invention there is provided an animal confinement apparatus comprising:

a generally channel shaped frame structure having a head end for receiving a head of an animal to be confined, two sides each for extending along a respective side of the animal to be confined, a tail end remote from the head end;

a head gate assembly at the head end operable to move from an open position to a closed position in which the neck of the animal is grasped for confinement thereof;

the head gate assembly comprising:

a support frame arranged to be mounted on the frame structure at the head end;

a pair of head gate doors;

each door having a vertical bar for cooperating with the vertical bar of the other of the doors to trap the neck of the animal therebetween;

each door being mounted on a hinge support member carried on the support frame for pivotal movement of the door and its vertical bar about a respective pivot axis generally parallel to the first vertical post member and spaced outwardly toward a respective side of the support frame;

the doors being movable from a closed position in which the vertical bars lie in a common plane including the pivot axes to an open position in which the vertical bars are positioned on a side of the common plane facing the tail end to allow the head of the animal to enter;

an operating device movable by a worker for engaging and pushing the vertical bars into the closed position;

wherein the operating device includes an elongate manually operable member extending from the head gate doors to a position adjacent the tail end.

BRIEF DESCRIPTION OF THE DRAWINGS

One embodiment of the invention will now be described in conjunction with the accompanying drawings in which:

FIG. 4 is an isometric view from the top of the closure mechanism for operating on the head gate.

In the drawings like characters of reference indicate corresponding parts in the different figures.

DETAILED DESCRIPTION

Figure 1:
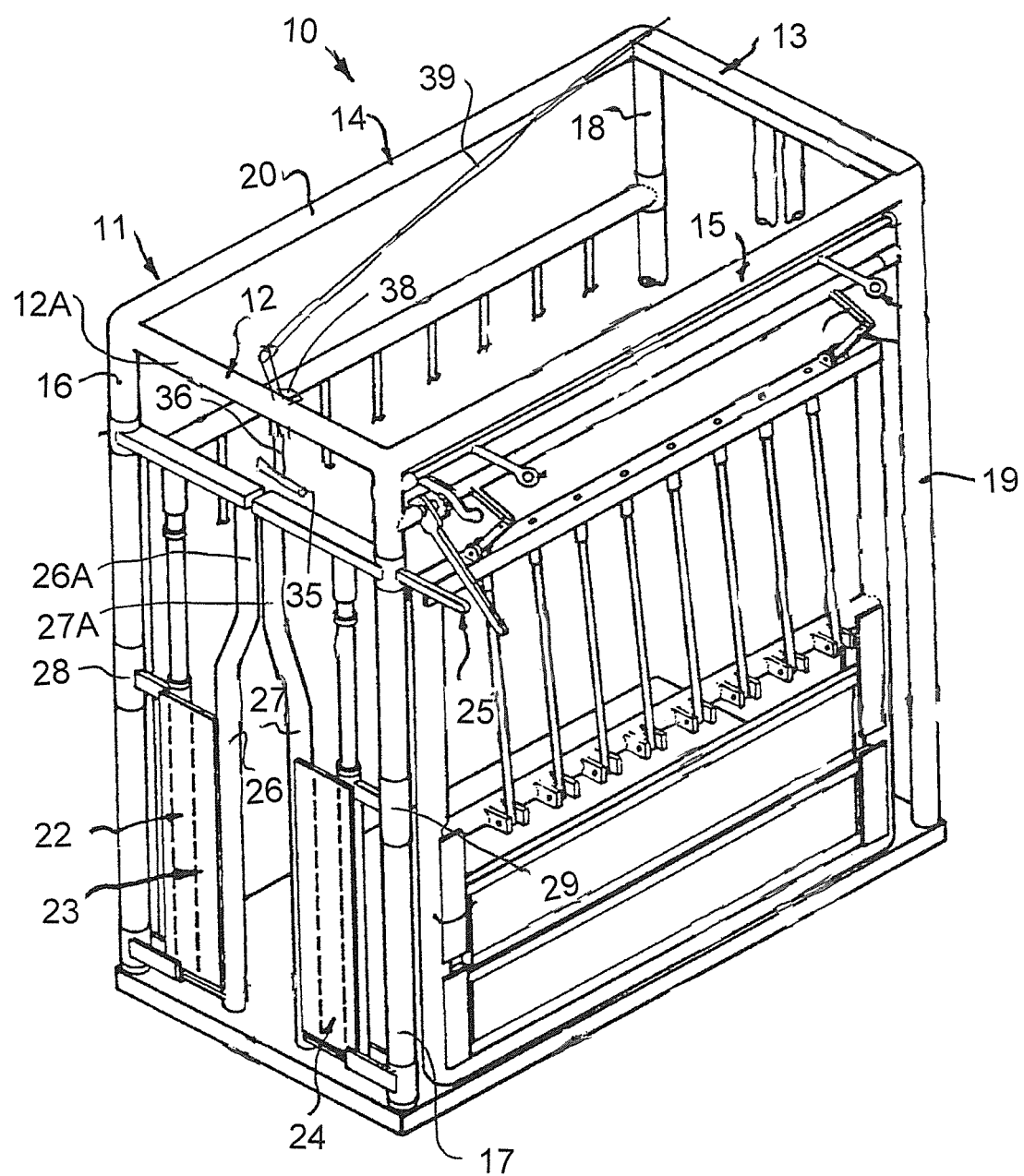
FIG. 1 is an isometric view of a cattle confinement chute including a head gate according to the present invention.

A squeeze chute generally indicated at 10 is formed by a frame structure 11 forming a front panel 12, a rear panel 13, a first side 14 and a second side 15. Each of the panels is formed by vertical posts so that the front panel includes posts 16 and 17 and the rear panel includes posts 18 and 19. The front and rear panels are connected by horizontal rails 20 and 21 at the top part of the frame forming a rigid channel shaped frame structure into which an animal to be confined can enter from the rear panel to a position between the side panels and rearwardly of the front panel.

The front panel includes a head gate assembly generally indicated at 22 including a first door 23 and a second door 24 each of which is pivotally mounted for opening and closing movement around a vertical axis at or adjacent the post from a closed or confinement position shown in FIG. 1 to a receiving position in which the doors are pivoted to face inwardly and to the chute so that the animal pushes its head between the doors as it tries to escape out of the front of the squeeze chute with the animal automatically pushing the doors to the closed confinement position as it engages the doors. The doors can then be pivoted to a release position facing outwardly of the front of the squeeze chute in which the animal can escape when the confinement is no longer required.

As shown the doors are mounted for pivotal movement around axes at or adjacent the vertical posts 16 and 17 on bushings. However as will be well known to one skilled in the art, alternative support arrangements for the doors may be provided as required. Suitable latching devices for the doors in the closed position will also be provided but are not shown herein for convenience of illustration and will be well known to one skilled in the art. In addition in many cases a cable control assembly is provided which connects the doors and ensures that the doors remain in synchronism so that if one door is pushed, both of the doors move into the required location. The doors can be manually operated by a lever 25 which projects outwardly from the post 17 toward the side 15 of the squeeze chute.

The pair of head gate doors 23 and 24 are arranged with each door having a vertical bar 26, 27 for cooperating with the vertical bar of the other of the doors to trap the neck of the animal therebetween. Each door is mounted on a hinge support member 28, 29 carried on the support frame for pivotal movement of the door and its vertical bar about a respective vertical pivot axis 30, 31 generally parallel to the first vertical post member and spaced outwardly toward a respective side of the support frame 11.

Figure 2:
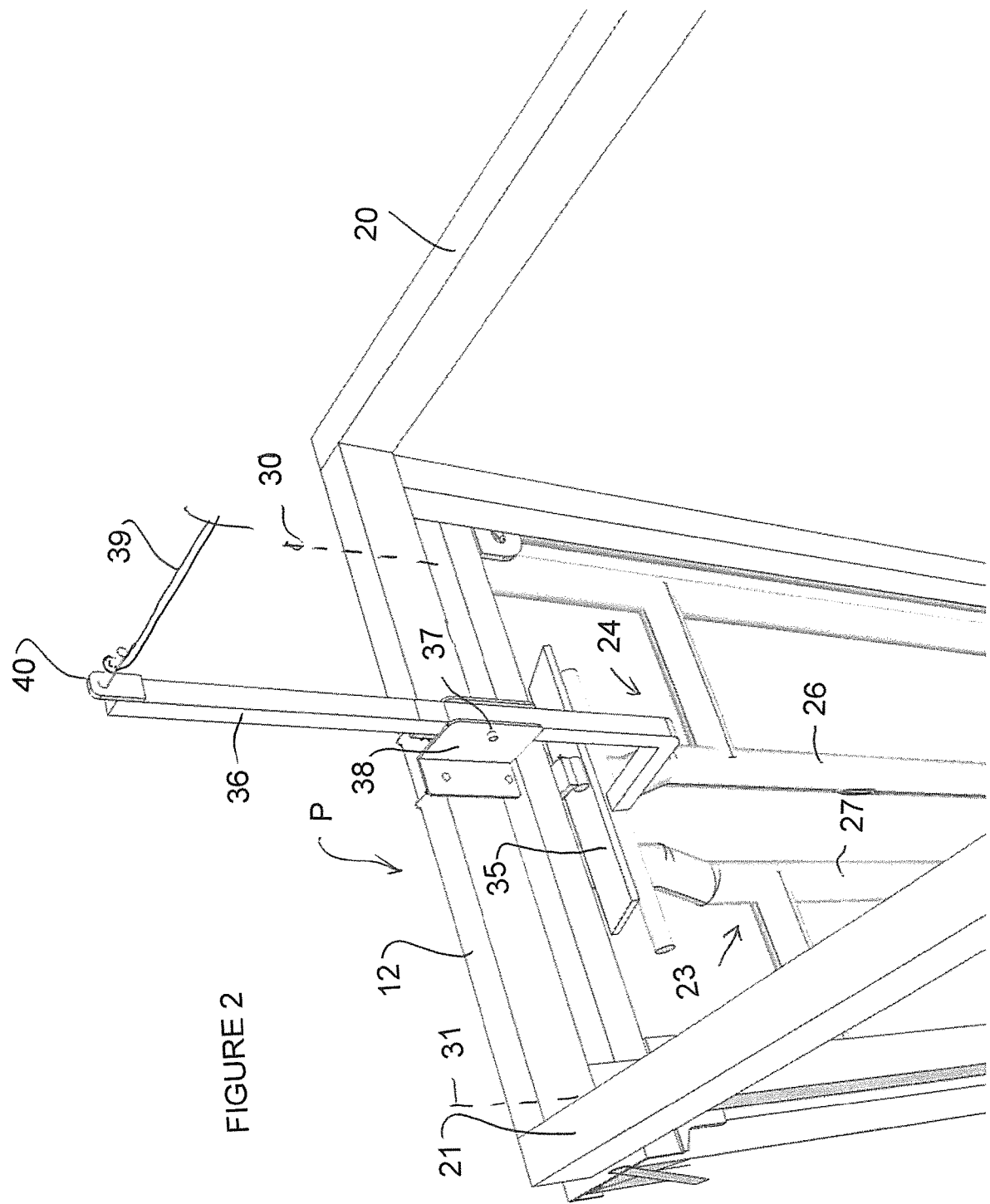
FIG. 2 is an isometric view of the head gate only in the closed position.
Figure 3:
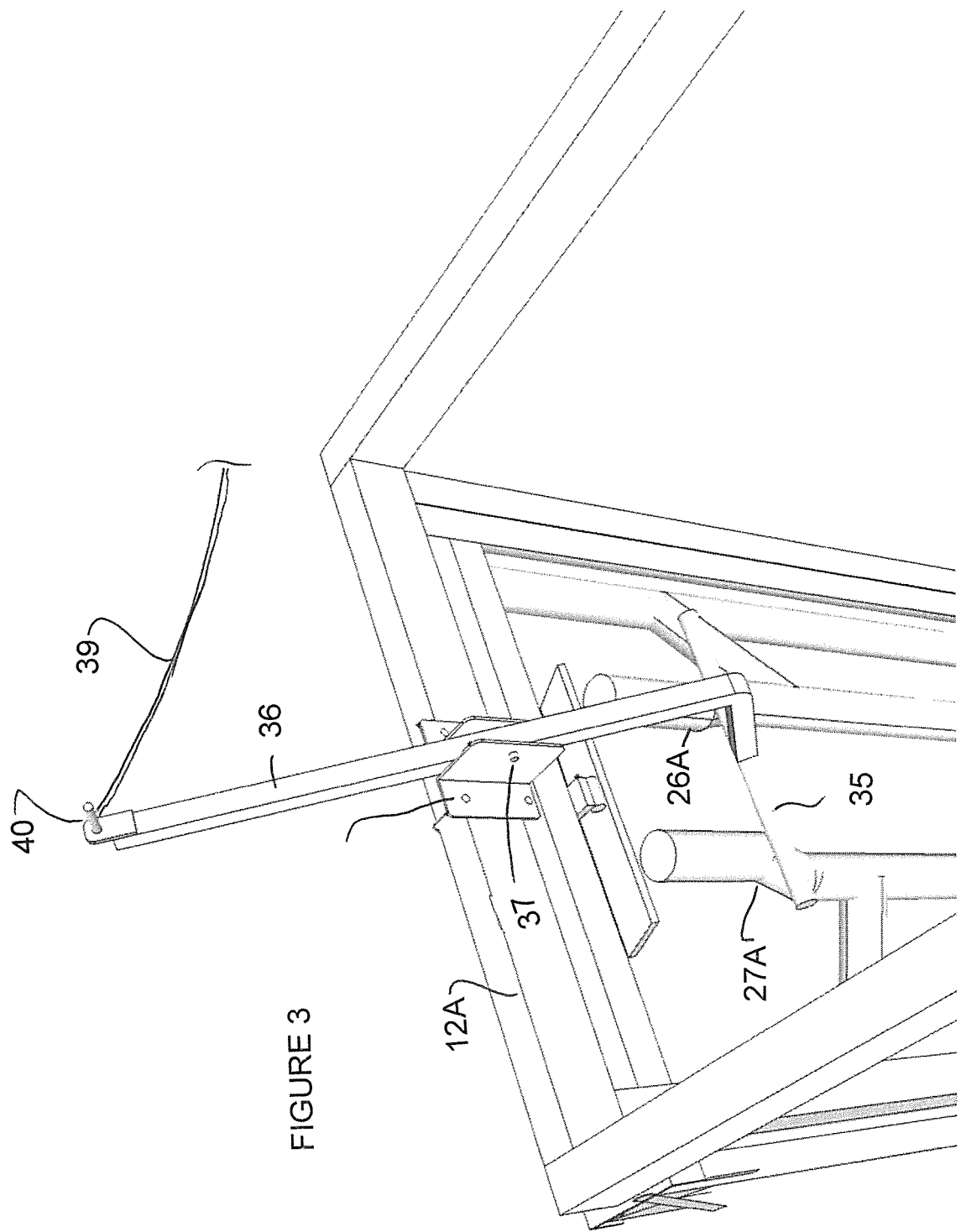
FIG. 3 is an isometric view of the head gate only in the open position.

The doors are movable from the closed position shown in FIGS. 1 and 2 in which the vertical bars lie in a common plane P including the pivot axes 30, 31 to an open position in which the vertical bars are positioned on a side of the common plane P facing the rear end of the chute and the incoming animals to allow the head of the animal to enter between the bars while they are spaced apart.

In order to allow the worker to better control the closing of the gate in the event that one animal n the chute becomes nervous or disoriented and wants to back up from the gate, a transverse abutment member extends across the vertical bars in the open position adjacent a top of the vertical bars and is movable to assist in closing the gate. This comprises a simple bar 35 across the rear face of the gates which extends to either side of the top part of the posts 26 and 27. At this location the posts are closer together as indicated at portions 26A and 27A so that the posts are very close at this upper end portion. The posts are further apart at the height where the animal head enters. An operating device movable by a worker is provided for moving the bar 35 toward the common plane P to push the vertical bars into the closed position.

The transverse bar 35 is horizontal and generally parallel to the common plane P and is mounted on a pivot mounting rod 36 standing upwardly from the bar 35 at right angles to the bar for pivotal movement. The rod 36 is carried on a pivot bracket 38 which provides pivotal movement of the rod 36 about a horizontal axis of a pin 37 generally parallel to the common plane P. The bracket is carried on a cross member 12A of the front panel 12 of the frame 11A so that the pin 37 is above the vertical bars 26A, 27A.

The operating device includes an elongate manually pull cord 39 extending from a connector 40 at the top of the rod 36 at the head gate doors in a direction toward the rear end 13 of the chute that is toward the incoming animals to allow the worker to pull the doors to the closed position from a remote location at a rear of an incoming animal.

That is the worker handling the animals can stand to one side of the chute at or adjacent the rear 13 of the chute and can encourage the animal from the rear to move forward. In the event that one animal looks to back up due to nervousness of the head gate, while the neck remains at the head gate, the worker can pull the cord and push the bars 26, 27 into the closed position without assistance from the animal pushing forward.

The bracket 38 comprises two parallel plates 381, 382 bolted to the beam 12A by fasteners 383. The rod 36 includes a main portion 361 lying between the plates and a forwardly extending lower portion 362 at right angles to the main portion 361 so as to locate the bar at the front end of the portion 362 at the required location relative to the gate bars 26A and 27A so that the forward movement of the bar caused by the pivotal movement of the portion 361 on the pin 37 acts to push the head gate into the closed position.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An animal confinement apparatus comprising:
   a generally channel shaped frame structure having a head end for receiving a head of an animal to be confined, two sides each for extending along a respective side of the animal to be confined, a tail end remote from the head end;
   a head gate assembly at the head end operable to move from an open position to a closed position in which the neck of the animal is grasped for confinement thereof;
   the head gate assembly comprising:
   a support frame mounted on the frame structure at the head end;
   a pair of head gate doors;
   each head gate door having a respective vertical bar for cooperating with a respective vertical bar of the other of the doors to trap the neck of the animal therebetween;
   each head gate door being mounted on a hinge support member carried on the support frame for pivotal movement of the door and its respective vertical bar about a respective pivot axis generally parallel to the respective vertical bar and spaced outwardly toward a respective side of the support frame;
   the head gate doors being movable from a closed position in which the respective vertical bars lie in a common plane including the pivot axes to an open position in which the respective vertical bars are positioned on a side of the common plane facing the tail end to allow the head of the animal to enter;
   an operating device movable by a worker for engaging and pushing the respective vertical bars into the closed position;
   wherein the operating device includes a transverse abutment member extending across the vertical bars in the open position adjacent a top of the vertical bars and an elongate manually operable member;
   the transverse abutment member engaging and operating the head gate doors when the elongate manually operable member is operated for moving the head gate doors to the closed position;
   the elongate manually operable member extending from the head gate doors to a position adjacent the tail end.

2. The apparatus according to claim 1 wherein elongate manually operable member is flexible acting as a pull cord to allow the worker to pull the head gate doors to the closed position from at the tail end at a rear of an incoming animal.

3. The apparatus according to claim 1 wherein the transverse abutment member comprises an elongate bar which is horizontal and generally parallel to the common plane for engaging the vertical bars.

4. The apparatus according to claim 3 wherein the transverse bar is mounted on a pivot mounting member for pivotal movement about a horizontal axis generally parallel to the common plane.

5. The apparatus according to claim 4 wherein the horizontal axis is above the vertical bars.

6. The apparatus according to claim 4 wherein the pivot mounting member is carried on the support frame above the head gate doors.

* * * * *